June 19, 1951  E. B. THOMAS  2,557,620
SIGNAL AND ACTUATING MEANS THEREFOR
Filed Dec. 22, 1945  3 Sheets-Sheet 1
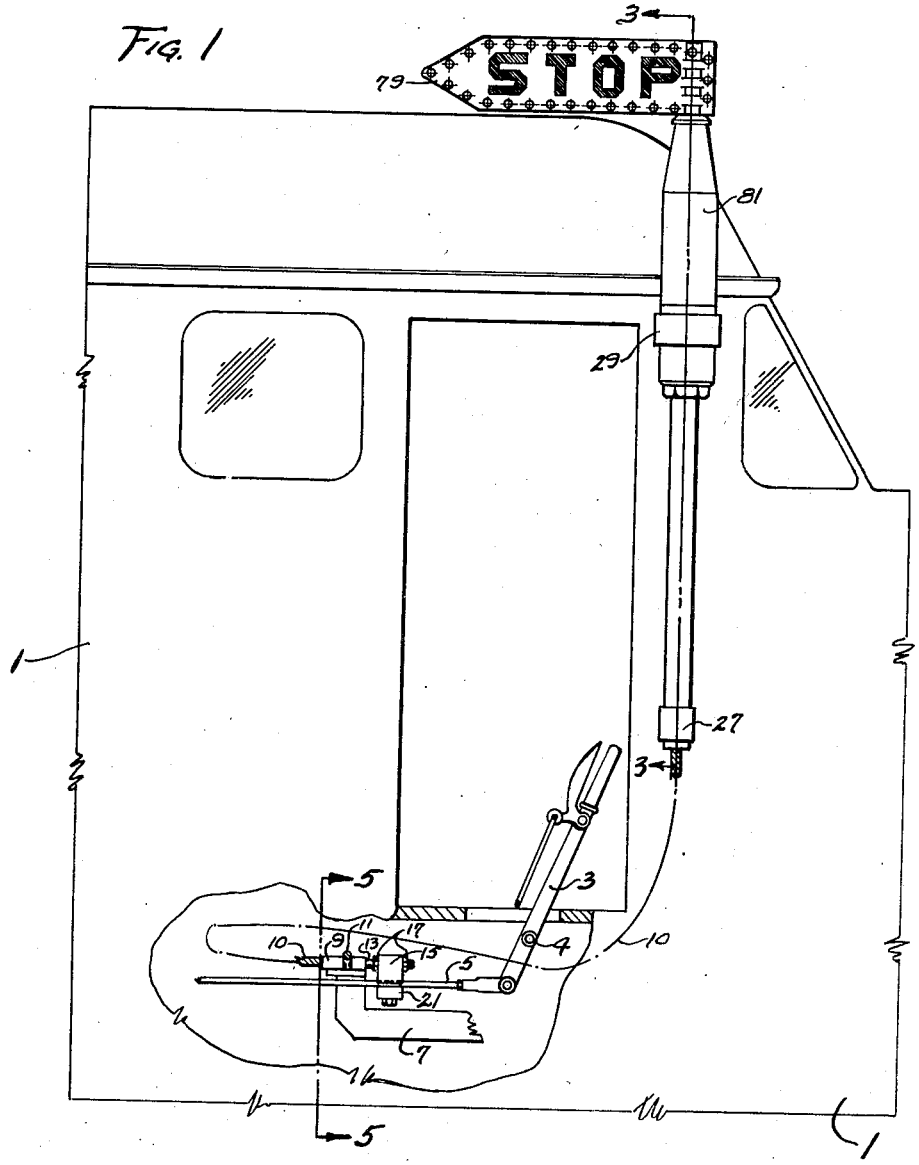
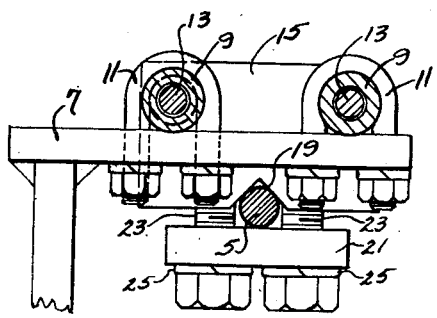
INVENTOR.
ERNEST B. THOMAS
BY Edmund W. E. Kamm
ATTORNEY.

June 19, 1951 — E. B. THOMAS — 2,557,620
SIGNAL AND ACTUATING MEANS THEREFOR
Filed Dec. 22, 1945 — 3 Sheets-Sheet 2

INVENTOR.
ERNEST B. THOMAS
BY Edmund W. E. Kamm
ATTORNEY.

June 19, 1951 E. B. THOMAS 2,557,620
SIGNAL AND ACTUATING MEANS THEREFOR
Filed Dec. 22, 1945 3 Sheets-Sheet 3

INVENTOR.
ERNEST B. THOMAS
BY Edmund W. E. Kamm
ATTORNEY.

Patented June 19, 1951

2,557,620

UNITED STATES PATENT OFFICE 2,557,620

SIGNAL AND ACTUATING MEANS THEREFOR

Ernest B. Thomas, Marion, Ind.

Application December 22, 1945, Serial No. 636,684

4 Claims. (Cl. 116—35)

This invention relates to signal means and actuating means for said means. More specifically, it relates to the stop signals utilized on school busses and the like, which are set when the bus is to load or unload passengers.

In many communities it is required by law that, when a school bus is stopped to load or unload passengers, the emergency brake must be set and also a signal must be set to warn any approaching or following vehicles to stop. Failure to observe either or both of these precautions has led to serious accidents. To insure a more complete compliance with the requirements of such laws, I have heretofore devised a mechanism disclosed in Patent Number 1,814,233, issued to me on July 14, 1931, for Vehicle Signal, by which the stop signals are connected to be operated by the emergency brake mechanism so as to be moved to effective position when the brake is set and to be restored to ineffective position when the brake is released.

An object of instant invention is to accomplish the same result but in a more facile manner.

Another object of the invention is to provide a signalling mechanism which can be readily applied to existing vehicles.

Yet another object of the invention is to provide a structure which can be easily and quickly installed.

Still another object of the invention is to provide a structure which is simple and positive in operation.

These and other objects of the invention will become apparent from a study of the drawings which are attached hereto and made a part hereof, and in which:

Figure 1 is a side elevation with parts broken away to show the emergency brake lever, the signals or indicators in retracted position and the connections between the lever and signals.

Figure 5 is a section taken substantially on the line 5—5 of Figure 1.

Figure 2:
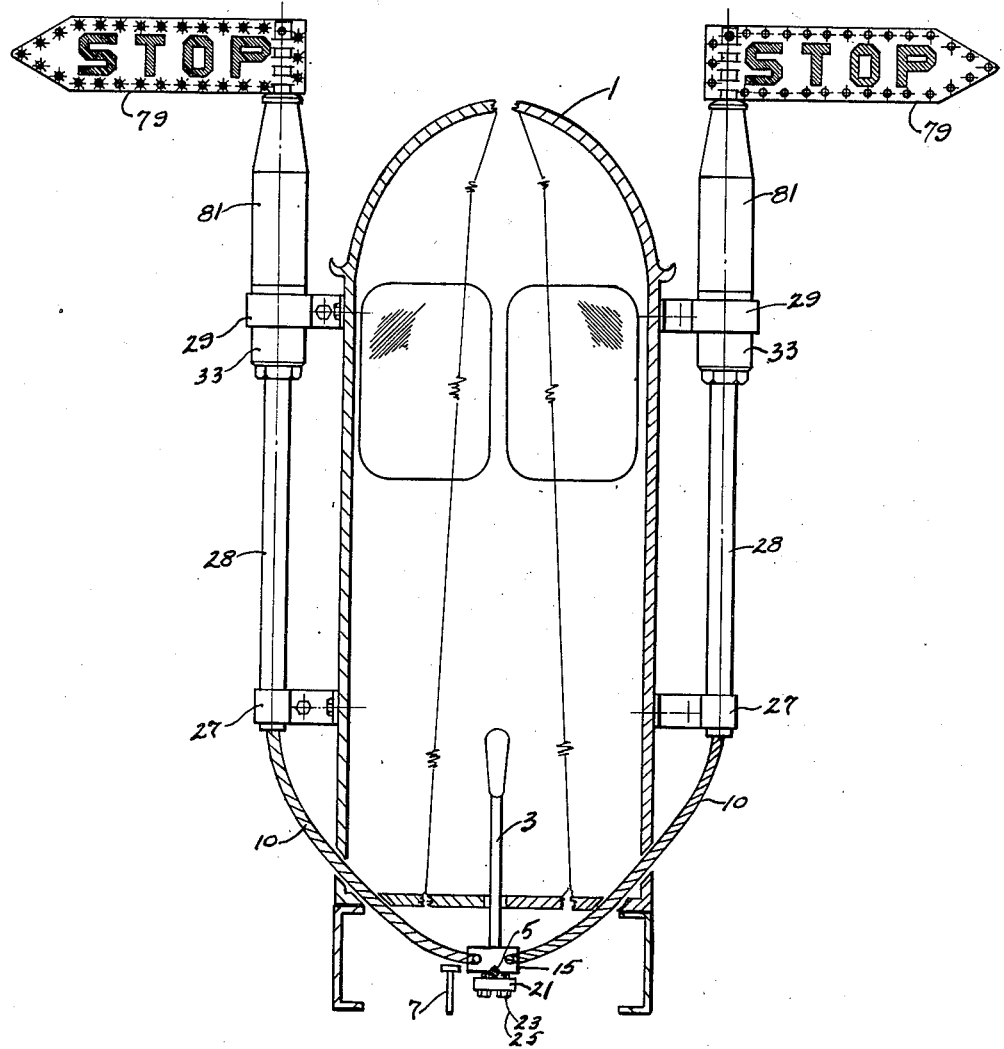
Figure 2 is an end elevation of the structure of Figure 1, but showing the signals in effective position.

Referring now to Figure 1, numeral 1 indicates the body of the bus. An emergency brake lever 3 is pivotally mounted, at 4 on transmission case (not shown) or other suitable member of the vehicle, and the lower end of the lever has attached to it the brake rod 5.

A bracket 7 is also mounted on the transmission housing or other suitable support and the end ferrules of two flexible cable housings 10 are firmly attached to the bracket by means of U-bolts 11. The ends of the flexible cables 13 project from the housings and are fixed in a travelling block 15 by means of suitable fastenings 17.

The lower face of the block 15 is provided with a V-groove 19 to receive the brake rod 5 and is clamped in place thereon by means of the plate 21, lockwashers 23 and capscrews 25.

Supported by brackets 27 and 29 on each side of the vehicle body are the signal mechanisms. Since both mechanisms are identical except that the cam of one is provided with a left hand helical groove while the other has a right hand groove, the description of one mechanism is deemed sufficient to disclose the invention fully.

Figure 3:
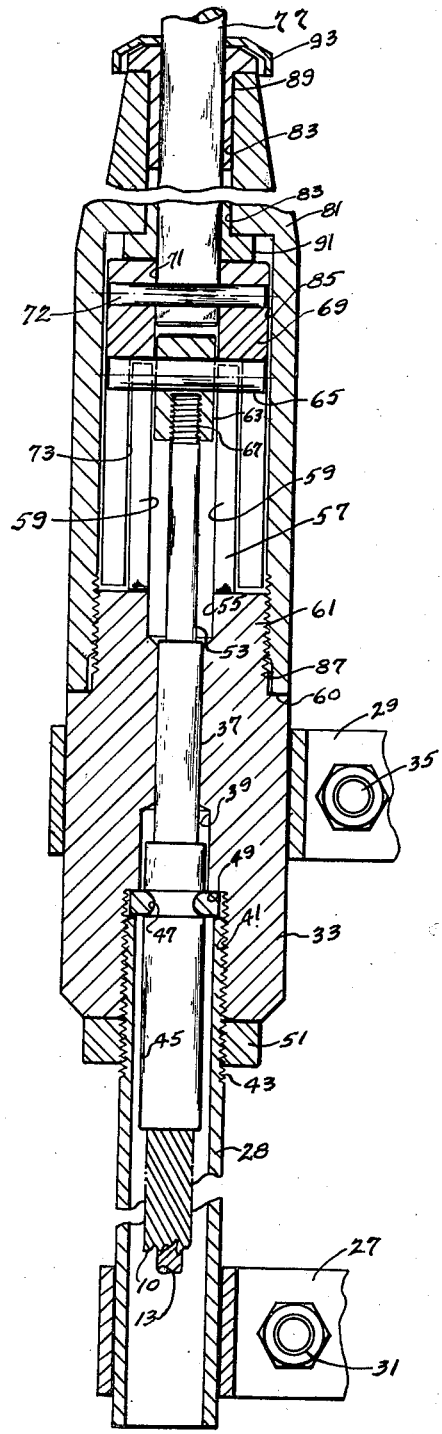
Figure 3 is a sectional view taken substantially on the line 3—3 of Figure 1, but omitting the signal.

Referring then to Figure 3, the bracket 27 is fixed to the body 1 and is clamped upon the tube 28 by means of fastening means 31.

A body member 33 is clamped in bracket 29 (also attached to the body 1) by fastening means 35 and is provided with a central, small bore 37 which merges with a larger bore 39 and the latter into a third and larger bore 41 which is internally threaded to receive the threaded end 43 of tube 28.

The end ferrule 45 of the cable housing 10 is provided with a flange 47 or C washer, which is clamped between the shoulder 49 at the juncture of bores 39 and 41 and the end of the tube 28. A jam nut 51 holds the parts in position. The end connection 53 of the cable 13 passes through bores 39 and 37 and through a bore 55 formed in the bearing portion 57 of the body.

The bearing is diametrically slotted at 59, said slots being open at their upper ends and terminating adjacent the externally threaded boss 61 which is also formed on the body. A cylindrical plug 63 rides freely in the bore 55 and bears a transverse pin 65 which rides in and projects beyond the slots 59. In the lower end of the plug is formed a threaded opening which receives the threaded end 67 of the cable end connection 53.

Figure 4:
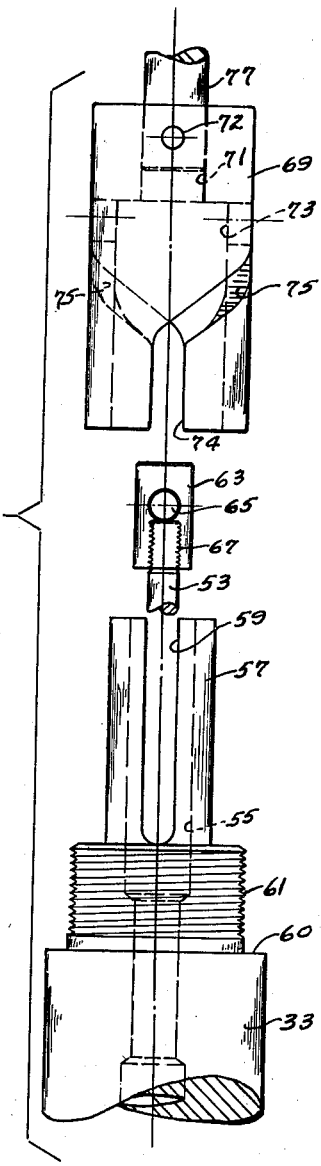
Figure 4 is an exploded view of the cam mechanism.

A cylindrical cam 69 is provided with a bore 71 and a counterbore 73, the latter being adapted to fit over and rotate on the bearing 57. As shown in Figure 4, the cam is provided with two right hand, helical, diametrically-opposed cam grooves 75, in which ride the outer ends of the pin 65. The opposite signal is provided with a cam having left hand grooves. The grooves are parallel to the axis of the cam at the lower ends 74 and then run helically upwards for ninety degrees and the grooves are again parallel to the axis of cam for a short distance. This locks signals in parked position, making it impossible to readily jar or vibrate out of position.

A shaft 77 is fixed in the bore 71 by pin 72 and has attached to its upper end, by any suitable means, the signal 79.

A cap 81 is provided with a bore 83 and a counterbore 85, which is internally threaded at its lower end. The threaded portion is counterbored at 87. Flanged bearings 89 and 91 are pressed into the bore 83 from the top and bottom for supporting the shaft 77. The cap is screwed onto the boss 61. The flange of bearing 91 serves also as thrust bearing for holding the cam in place. The counterbore 87 permits the cap to seat cleanly on the shoulder 60 disposed at the base of the boss 61. A dished shield 93 is pressed over the shaft 77 and rests invertedly on the bearing 89 to assist in keeping foreign matter out of the bearing.

Operation

When the vehicle is stopped, the operator sets the emergency brake by pulling the lever 3 counter-clockwise (Figure 1), moving the brake rod 5, travelling block 15 and the cables 13 to the right, relative to the cable housings 9—10, which are held against endwise movement by the clamps 11. This results in a downward pull on the cables 13, their end connections 53, together with the plug 63 and pin 65. As the pin moves downwardly, it is held from rotation about the axis of the cable by the slots 59. The cam 69, however, is free to rotate on the bearing 57, and, in the case of the cam shown in Figure 4, the rotation will be counter-clockwise when viewed from the top. The rotation will continue through one quadrant, whereupon the pin 65 will move into the straight portions 74 of the grooves and the cams will stop. The pin, however, will continue to move until the cable is stopped by application of the brake. The grooves 74 and slots 59 are of sufficient length to permit a full stroke of the brake lever without danger of the pin 65 hitting the lower ends of the slots so that the braking will not be interfered with.

It will be apparent that the mechanism shown in Figure 4 is suitable for the right side of the vehicle and that the ninety-degree rotation of the cam and shaft 77 will turn the right hand indicator from the Figure 1 to the Figure 2 position.

The signal is retracted by reversing the action of the parts, which is, of course, accomplished by rotating the brake lever 3 (Figure 1) in a clockwise direction. The cable is of course under compression during such retraction, and the thrust lifts the plug and rotates the cam in the reverse direction to retract the signal and to hold it retracted.

It will be obvious that the signal on the left (Figure 2) will be rotated clockwise when viewed from the top to move it into the Figure 2 position. This is, of course, accomplished by forming the cam grooves 75 as a left hand, rather than a right hand helix.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a signalling apparatus, the combination of a signal, means mounting said signal for movement to and from effective position, a cam mechanism for moving said signal, brake operating means movable to a variable brake setting position from a predetermined brake off position, and power transmitting means connecting said cam mechanism for operation by said brake operating means to move said signal to effective position when said operating means moves to brake setting position, said cam mechanism serving to set the signal during a portion of the movement of said brake operating means and having a lost motion connection with said signal whereby said brake operating means may continue to move after the signal is set.

2. In a signalling apparatus, the combination of a signal, means mounting the signal for movement to and from transverse position, a cylindrical cam connected to operate the signal, said cam having a helical slot terminating in a slot which is parallel to the axis of the cam, an actuating member adapted to work in the slots, said parallel slot determining the transverse position of the sign, and means for moving the member parallel to said axis, said last named means comprising power transmission means and a brake operator connected to actuate said transmission means, said brake operator being mounted for movement from a fixed, ineffective position to a number of effective positions, said helical slot having a length less than that through which the actuating member is moved by a movement of said brake operator to any of its effective positions.

3. In a signalling apparatus, the combination of a signal, means mounting said signal for rotation between two effective positions, a body having a longitudinally slotted boss, a hollow, cylindrical cam fitted over said boss and having actuating groove means formed therein, said means comprising a groove parallel to the axis of the cam, a helical groove connected therewith and extending partly around the cam and terminating in a groove parallel to the axis, an actuating member mounted for movement axially of said boss and extending into said slots and grooves, said parallel grooves and member determining the effective positions of the signal, a brake operator and power transmission means connecting said operator to actuate said member, said brake operator being mounted for movement from a fixed, ineffective position to a number of effective positions, said helical slot having a length less than that through which the actuating member is moved by a movement of said brake operator to any of its effective positions.

4. In a signalling apparatus, the combination of a signal, means mounting said signal for rotation to and from effective position, a body having a longitudinally slotted boss, a hollow, cylindrical cam fitted over said boss and having actuating grooves formed therein, an actuating member mounted for movement axially of said boss and extending into said slots and grooves, a brake operator and push-pull cable power transmission means connecting said operator to actuate said member, each of said grooves being formed as a quarter helix terminating in a portion which is parallel to the cam axis whereby the signal will be first rotated ninety degrees and then held as said operator is actuated, said brake operator being mounted for movement from a fixed, ineffective position to a number of effective positions, said helical slot having a length less than that through which the actuating member is moved by a movement of said brake operator to any of its effective positions.

ERNEST B. THOMAS.

REFERENCES CITED

The following references are of record in the file of this patent:

UNITED STATES PATENTS

| Number | Name | Date |
|---|---|---|
| 1,121,870 | Rolph | Dec. 22, 1914 |
| 1,263,320 | Hughes | Apr. 16, 1918 |
| 1,350,463 | Miller et al. | Aug. 24, 1920 |
| 1,415,814 | Dyer | May 9, 1922 |
| 1,452,392 | Ryan | Apr. 17, 1923 |
| 1,654,060 | Warbis | Dec. 27, 1927 |
| 1,814,233 | Thomas | July 14, 1931 |
| 1,860,034 | Kane | May 24, 1932 |